(12) United States Patent
Amano

(10) Patent No.: US 11,067,695 B2
(45) Date of Patent: Jul. 20, 2021

(54) 3D IMAGING BY MULTIPLE SENSORS DURING 3D PRINTING

(71) Applicant: Konica Minolta Laboratory U.S.A., Inc., San Mateo, CA (US)

(72) Inventor: Jun Amano, Hillsborough, CA (US)

(73) Assignee: Konica Minolta Laboratory U.S.A., Inc., San Mateo, CA (US)

(*) Notice: Subject to any disclaimer, the term of this patent is extended or adjusted under 35 U.S.C. 154(b) by 44 days.

(21) Appl. No.: 16/466,317

(22) PCT Filed: Mar. 16, 2018

(86) PCT No.: PCT/US2018/022982
§ 371 (c)(1),
(2) Date: Jun. 4, 2019

(87) PCT Pub. No.: WO2018/183003
PCT Pub. Date: Oct. 4, 2018

(65) Prior Publication Data
US 2019/0344493 A1 Nov. 14, 2019

Related U.S. Application Data

(60) Provisional application No. 62/479,362, filed on Mar. 31, 2017, provisional application No. 62/479,361, filed on Mar. 31, 2017.

(51) Int. Cl.
*G01S 17/89* (2020.01)
*B29C 64/386* (2017.01)
(Continued)

(52) U.S. Cl.
CPC .............. *G01S 17/89* (2013.01); *B29C 64/10* (2017.08); *B29C 64/386* (2017.08); *G01S 17/87* (2013.01);
(Continued)

(58) Field of Classification Search
CPC ........ B29C 64/10; B29C 64/386; G01S 17/87; G01S 17/89; G06T 2200/04; G06T 2207/10028; G06T 2207/30144
(Continued)

(56) References Cited

U.S. PATENT DOCUMENTS

2010/0020306 A1 1/2010 Hall
2015/0045928 A1 2/2015 Perez et al.
(Continued)

FOREIGN PATENT DOCUMENTS

CN 205362676 U 7/2016
SE 537864 C2 11/2015

OTHER PUBLICATIONS

Extended European Search Report issued in corresponding European Application No. 18775897.4 dated Feb. 17, 2020 (7 pages).
(Continued)

*Primary Examiner* — Michael R Neff
(74) *Attorney, Agent, or Firm* — Osha Bergman Watanabe & Burton LLP

(57) ABSTRACT

A method for 3D printing an object, based on a 3D printable model of the object, includes scanning, by a first LiDAR sensor of a plurality of LiDAR sensors, a portion of the object while the object is being printed by a printer head. The method also includes generating an image of at least the portion of the object based on scanning the portion, generating a comparison by comparing the image with the 3D printable model, and sending a feedback signal that adjusts the printer head based on the comparison.

17 Claims, 3 Drawing Sheets

(51) Int. Cl.
*B29C 64/10* (2017.01)
*G01S 17/87* (2020.01)

(52) U.S. Cl.
CPC *G06T 2200/04* (2013.01); *G06T 2207/10028* (2013.01); *G06T 2207/30144* (2013.01)

(58) Field of Classification Search
USPC .......................................................... 382/154
See application file for complete search history.

(56) References Cited

U.S. PATENT DOCUMENTS

| | | |
|---|---|---|
| 2015/0367447 A1 | 12/2015 | Buller et al. |
| 2016/0210737 A1 | 7/2016 | Straub et al. |
| 2016/0236414 A1 | 8/2016 | Reese et al. |
| 2017/0046868 A1* | 2/2017 | Chernov ................. G06T 15/04 |
| 2017/0300038 A1* | 10/2017 | Chen ....................... G01S 17/88 |
| 2018/0015655 A1* | 1/2018 | Gheorghescu .......... B29C 48/18 |
| 2018/0133801 A1 | 5/2018 | Buller et al. |

OTHER PUBLICATIONS

Pitchaya Sitthi-Amorn et al., "MultiFab: A Machine Vision Assisted Platform for Multi-material 3D Printing"; ACM Transactions on Graphics, vol. 34, No. 4; XP055665917; Jul. 27, 2015 (11 pages).
International Preliminary Report on Patentability issued in corresponding International Patent Application No. PCT/US2018/022982, dated Oct. 10, 2019 (10 pages).
International Search Report issued in corresponding application No. PCT/US2018/022982 dated Jun. 26, 2018 (2 pages).
Written Opinion of the International Searching Authority issued in corresponding application No. PCT/US2018/022982 dated Jun. 26, 2018 (8 pages).

* cited by examiner

3D IMAGING BY MULTIPLE SENSORS DURING 3D PRINTING

The present application is a U.S. National Stage Application of PCT Application No. PCT/US2018/022982 filed on Mar. 16, 2018, which claims priority to U.S. Provisional Application No. 62/479,361 filed on Mar. 31, 2017, and U.S. Provisional Application No. 62/479,362 filed on Mar. 31, 2017. The contents of the priority applications are hereby incorporated by reference.

BACKGROUND

In general, 3D printing relates to the process of creating a physical object from a 3D model. Typically, 3D printing relates to depositing many layers of material successively to build up the 3D object from the 3D model.

In addition, 3D printing (3DP) may also be referred to as additive manufacturing (AM). At present, no effective methods of real-time 3D image capture exist due to issues in obtaining visible 3D images during fabrication of the objects. Commonly used imaging techniques based on cameras only provide 2D image of 3D object.

LiDAR, which stands for Light Detection and Ranging, is a remote sensing method that uses laser light to measure ranges and distance. Two commonly used operational methods are Pulsed laser (PL) with time-of-flight measurement and Continuous Wave (CW) laser with phase comparison. A pulsed laser system transmits and receives short, light pulses to measure time-of-flight to compute distance. This operational method requires expensive photodetectors and fast sampling ADC in the receiver. CW laser systems operate on the principle that the target object reflects a phase-shifted version of the original transmitted signal. A phase comparator in the receiver may compare the phase-shifted version of the received signal with the original signal. The phase comparator output may be used to compute distance.

By using a scanning LiDAR system with an array detector, 3D imaging may be obtained. However, currently available scanning LiDAR systems use mechanical scanning of the incident light to create a 3D image. As a result, present 3D LiDAR systems are large, heavy, expensive and not suitable for in-situ 3D imaging in AM/3DP systems.

Additionally, various defects may occur during 3D (three-dimensional) printing of an object. Therefore, it may be useful to generate and utilize 3D models of the 3D object in real-time. That is, it is desirable to observe and correct or at least reduce the defects during printing.

The following reference(s) may have subject matter related to the subject matter of the present invention.

U.S. Patent Publication No. 2016/0236414, "Method To Monitor Additive Manufacturing Process For Detection And In-Situ Correction Of Defects," Date of Publication: Aug. 18, 2016.

SUMMARY OF INVENTION

In accordance with one or more embodiments of the invention, a method for 3D printing an object based on a 3D printable model of the object comprises: scanning, by a first LiDAR sensor of a plurality of LiDAR sensors, a portion of the object while the object is being printed by a printer head; generating an image of at least the portion of the object based on scanning the portion; generating a comparison by comparing the image with the 3D printable model; and sending a feedback signal that adjusts the printer head based on the comparison.

In some aspects, the plurality of LiDAR sensors comprises three LiDAR sensors, and the three LiDAR sensors are spaced 120 degrees apart around a deposition plane comprising the object being printed.

In some aspects, the plurality of LiDAR sensors comprises four LiDAR sensors, and the four LiDAR sensors are spaced 90 degrees apart around the deposition plane comprising the object being printed.

In some aspects, the plurality of LiDAR sensors comprises six LiDAR sensors, and the six LiDAR sensors are spaced 60 degrees apart around the deposition plane comprising the object being printed.

In some aspects, the plurality of LiDAR sensors operate at a same wavelength, one of the plurality of LiDAR sensors closest to the printer head is active for scanning, and the rest of the plurality of LiDAR sensors are inactive for scanning.

In some aspects, the plurality of LiDAR sensors operate at different wavelengths, and all of the plurality of LiDAR sensors are active for scanning.

In some aspects, the method further comprises: activating the first LiDAR sensor in response to the first LiDAR sensor being in the same zone as the printer head; activating, while the first LiDAR is activated, a second LiDAR sensor spaced approximately 180 degrees from the first LiDAR, wherein the image is further generated based on scanning by the second LiDAR, wherein the remaining LiDAR sensors are not active while the first LiDAR and the second LiDAR are scanning.

A method in accordance with one or more embodiments of the invention comprises: obtaining a 3D printable model of an object; selecting a first scanning mode based on the 3D printable model of the object; scanning, according to the first scanning mode and by at least one sensor of a plurality of sensors, a portion of the object while the object is being printed by a printer head; generating a first image of at least the portion of the object based on scanning the portion using the first scanning mode; and generating a first comparison by comparing the image with the 3D printable model.

In some aspects, the method further comprises: selecting a second scanning mode based on the first comparison of the image with the 3D printable model; scanning, according to the second scanning mode, the portion of the object; generating a second image of at least the portion of the object based on scanning the portion using the second scanning mode; generating a second comparison by comparing the second image with the 3D printable model; and sending a feedback signal that adjusts the printer head based on the second comparison.

In some aspects, the first scanning mode is synchronous mode, and wherein the second scanning mode is asynchronous mode.

In some aspects, the method further comprises: selecting the portion of the object, wherein selecting the first scanning mode is based only on a segment of the 3D printable model corresponding to the portion.

In some aspects, the plurality of sensors comprises three LiDAR sensors, and the three LiDAR sensors are spaced 120 degrees apart around a deposition plane comprising the object being printed.

In some aspects, the plurality of sensors comprises four LiDAR sensors, and the four LiDAR sensors are spaced 90 degrees apart around the deposition plane comprising the object being printed.

In some aspects, the plurality of sensors comprises six LiDAR sensors, and the six LiDAR sensors are spaced 60 degrees apart around the deposition plane comprising the object being printed.

In some aspects, the plurality of LiDAR sensors operate at a same wavelength, one of the plurality of LiDAR sensors closest to the printer head is active for scanning, and the rest of the plurality of LiDAR sensors are inactive for scanning.

In some aspects, the plurality of LiDAR sensors operate at different wavelengths, and all of the plurality of LiDAR sensors are active for scanning.

In some aspects, each of the plurality of sensors is a LiDAR sensor.

BRIEF DESCRIPTION OF DRAWINGS

Embodiments of the invention will be described with reference to the accompanying drawings. However, the accompanying drawings illustrate only certain aspects or implementations of one or more embodiments of the invention by way of example and are not meant to limit the scope of the claims.

DETAILED DESCRIPTION

Figure 1:
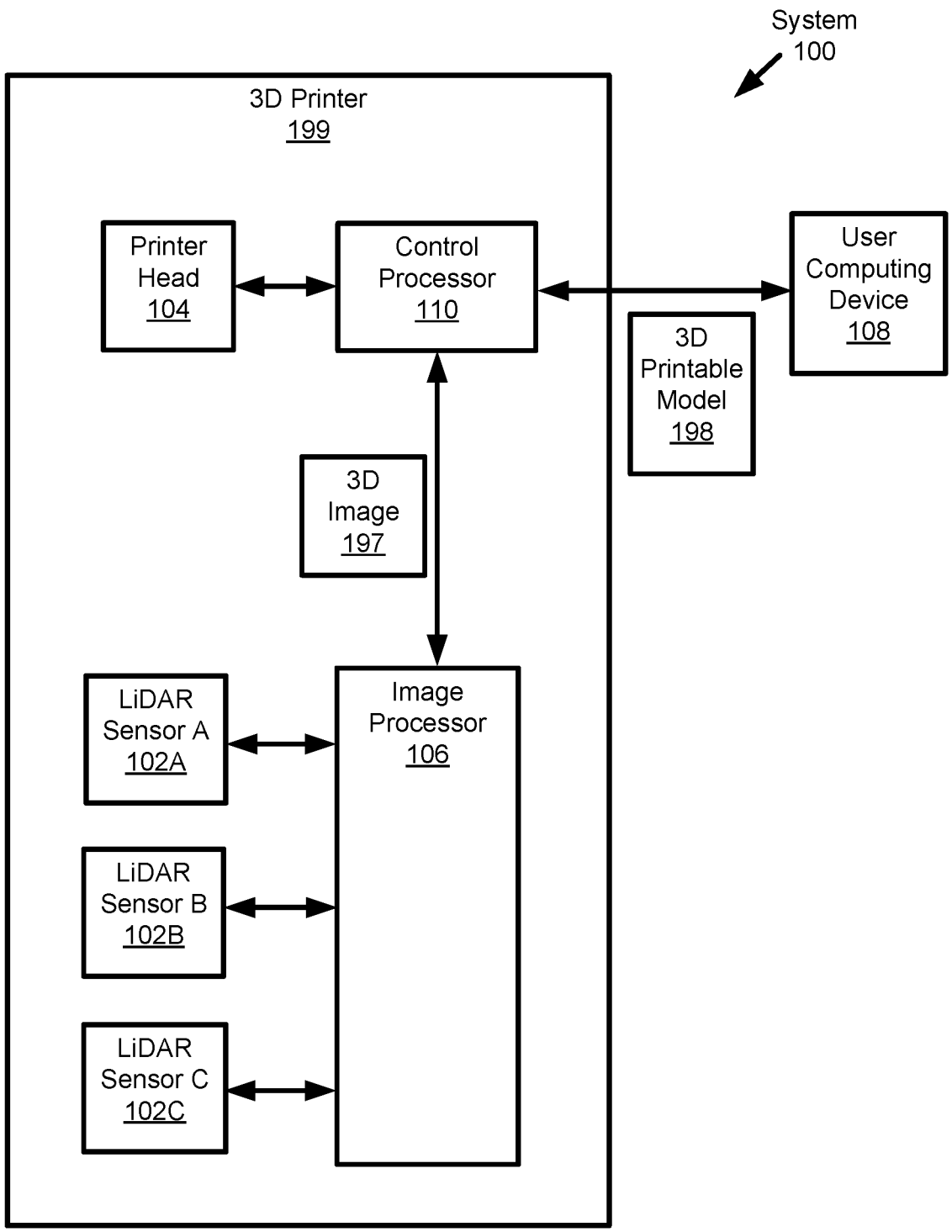
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

One or more embodiments of the invention provide for a method, a system, and a non-transitory computer readable medium (CRM) for selecting a scanning mode for 3D imaging of an object being printed. The selection may be based on the entire 3D printable model of the object (e.g., CAD drawing of the object). The selection may be based on the specific portion being scanned and the segment of the 3D printable model corresponding to the specific portion. In one or more embodiments, a different scanning mode may be selected if the initially selected scanning mode is producing poor results (e.g., large differences between the image generated from the scanning and the 3D printable model).

One or more embodiments of the invention provide for a method, a system, and a non-transitory computer readable medium (CRM) for 3D printing an object based on a 3D printable model of the object. While the object is printed, one or more sensors (e.g., Light Detection and Ranging (LiDAR) sensors) are scanning the object to generate an image of the object. The image of the object and the 3D printable model are compared to identify defects or potential defects in the object being printed. The printer head may be adjusted if the difference(s) between image and the 3D printable model of the object exceed one or more tolerances.

FIG. 1 shows a system (100) in accordance with one or more embodiments of the invention. As shown in FIG. 1, the system (100) includes a 3D printer (199) and a user computing device (108) (e.g., desktop PC, server, smart phone, tablet PC, etc.). The 3D printer (199) includes multiple LiDAR sensors (LiDAR A (102A), LiDAR B (102B), LiDAR C (102C)), an image processor (106), a control processor (110), and a printer head (104). The user computer device (108) is connected to the 3D printer (199) via the control processor (110). Each of these components is discussed below. In one or more embodiments, the multiple sensors (102A, 102B, 102C) and/or the image processor (106) are in a separate computing device connected to the 3D printer (199). In one or more embodiments, the multiple sensors (102A, 102B, 102C) and/or the image processor (106) are components of the user computer device (108). In one or more embodiments, the control processor (110) and/or some functionality of the control processor (110) are located/performed in the cloud.

In one or more embodiments of the invention, the system (100) includes any numbery of LiDAR sensors (LiDAR A (102A), LiDAR B (102B), LiDAR C (102C)). Each LiDAR sensor may be an ultra-compact solid-state 3D LiDAR sensor, and may meet the following specifications: (i) Volume (size): below 100 cm$^3$, (ii) Measurement range: more than 2 m, (iii) Scanning angle (Horizontal): at least 60 degree to 120 degree, (iv) Scanning angle (Vertical): 5 degree, (v) Operational method: Time-of-flight measurement by pulsed laser or Frequency modulation measurement by continuous-wave (CW) laser; (vi) Scanning of laser light: MEMS mirrors, optical phased arrays, surface grating, or combination of those techniques, (vii) Resolution: 0.5 mm, (viii) Frame speed: at least 10 f/s (20 Hz), and (xi) Laser wavelength: 903 nm to 1.7 μm (various III-V and II-V semiconductor diode lasers, Distributed feedback (DFB) solid-state Nd:YAG laser, Class 1 Eye-safe per IEC 60825-1). The ultra-compact LiDAR sensors satisfy the above specifications are expected to be developed within 5 years. Examples for the currently available large size commercial LiDAR sensor include 3D-LiDar by Konica Minolta, LiDAR PUCK Hi-Res© by Volodyne, and S3 Solid State LiDAR Sensor© by Quanergy. Although FIG. 1 shows LiDAR sensors, other sensor types are also possible.

During 3D printing of an object, a raw material is deposited by the printer head (104) to generate the object. This deposition may take place on a layer-by-layer basis. Moreover, the deposition is onto a deposition plane in a deposition chamber (not shown) of the 3D printer (199). In one or more embodiments of the invention, the deposition plane may contain sacrificial and support materials on the bottom. The raw material may be polymer, metal, ceramic, or those composite in powder, filament or ink forms. The plurality of LiDAR sensors (LiDAR A (102A), LiDAR B (102B), LiDAR C (102C)) may be placed around the deposition plane at an angle between 1 to 5 degree above the deposition plane. The multiple LiDAR sensors effectively partition the deposition plane, and thus also the object being printed, into multiple zones. Each zone corresponds to one of the LiDAR sensors.

The plurality of LiDAR sensors (LiDAR A (102A), LiDAR B (102B), LiDAR C (102C)) may be placed in-situ (i.e. inside the deposition chamber) or ex-situ (i.e. outside the deposition chamber) of the 3D printer (104) within the measurement range of the plurality of LiDAR sensors (LiDAR A (102A), LiDAR B (102B), LiDAR C (102C)).

In one or more embodiments of the invention, the system (100) includes three LiDAR sensors. The three LiDAR sensors are spaced 120 degrees apart, or approximately 120 degrees apart, around the deposition plane.

In one or more embodiments of the invention, the system (100) includes four LiDAR sensors. The four LiDAR sensors are spaced 90 degrees apart, or approximately 90 degrees apart, around the deposition plane. This configuration provides about 30% higher resolution than the configuration with three LiDAR sensors because of higher frame rate with 30% higher data volume and is suitable for medium size 3D printers. Data analytics and process correction are done at edge computing or cloud computing.

In one or more embodiments of the invention, the system (100) includes six LiDAR sensors. The six LiDAR sensors are spaced 60 degrees apart, or approximately 60 degrees apart, around the deposition plane. This configuration provides the highest resolution, over 50% higher than the configuration with three LiDAR sensors. However, data volume is much higher that previous two configurations. It is suited for large 3D Printer and data analytics and process correction are conducted through cloud computing.

In one or more embodiments of the invention, the plurality of LiDAR sensors (LiDAR A (102A), LiDAR B (102B), LiDAR C (102C)) operate at the same wavelength and only one of the plurality of LiDAR sensors (LiDAR A (102A), LiDAR B (102B), LiDAR C (102C)) is active at a time (Synchronous operation mode). In other words, at a given time, only the LiDAR sensor in the same zone as the printer head (104) is active. The other LiDAR sensors in other zones, where the printer head is not currently present, are not active. One imaging cycle includes scanning by each of the plurality of LiDAR sensors (LiDAR A (102A), LiDAR B (102B), LiDAR C (102C)). The imaging cycle may be synchronized with a printing cycle (i.e. the cycle of movement of the printer head) to provide a real-time image of the object being fabricated. In Synchronous operation mode, advantages include lower power operation, single wavelength operation of lasers, and lower volume of image data.

In one or more embodiments of the invention, the plurality of LiDAR sensors (LiDAR A (102A), LiDAR B (102B), LiDAR C (102C)) operate at different wavelengths to avoid cross-talking, and all of the plurality of LiDAR sensors (LiDAR A (102A), LiDAR B (102B), LiDAR C (102C)) are active simultaneously (Asynchronous operation mode). In other words, in asynchronous operation mode, regardless of where the printer head (104) is currently located, all LiDAR sensors are active. The imaging cycle may be synchronized with the printing cycle to provide a real-time image of the object being fabricated. In Asynchronous operation mode, advantages include multi-angle images (i.e. with triangulation) and no zone stitching.

In one or more embodiments, only (i) the LiDAR sensor in the same zone as the printer head (104) and (ii) the LiDAR sensor in the zone that is spaced approximately 180 degrees or the closest to 180 degrees from the zone having the printer head (104) are active. This is partial asynchronous operation mode.

In one or more embodiments of the invention, the 3D printer (199) includes the image processor (106). The image processor (106) is a digital signal processor used for image processing. In Synchronous operation mode, the image processor (106) switches the plurality of LiDAR sensors (LiDAR A (102A), LiDAR B (102B), LiDAR C (102C)) on and off, such that only one of the plurality of LiDAR sensors (LiDAR A (102A), LiDAR B (102B), LiDAR C (102C)) is on at a time. In Asynchronous operation mode, the image processor (106) switches the plurality of LiDAR sensors (LiDAR A (102A), LiDAR B (102B), LiDAR C (102C)) on and off simultaneously. The image processor (106) may receive a set of distances and angles (i.e., measurements) related to the object being deposited, and process the measurements into a 3D image (197).

In one or more embodiments of the invention, the system (100) includes a user computing device (108). The user computing device (108) may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments of the invention.

In one or more embodiments of the invention, the user computing device (108) provides a 3D printable model (198) of the object to the 3D printer (199). The 3D printable model (198) may be created with a computer-aided design (CAD) package, via a 3D scanner, or by a plain digital camera and photogrammetry software. The 3D printable model (198) may be created as geometric data for 3D computer graphics. In one or more embodiment, the 3D printable model (198) is downloaded from a website.

In one or more embodiments, the control processor (110) controls operation of the printer head (104) to generate (i.e., print) the object based on the 3D printable model (198). In one or more embodiments, the control processor (110) compares the image (197) and the 3D printable model (198). If one or more differences between the image (197) and the 3D printable model (198) exceed a tolerance(s), this is an indication that the printed object has a defect and/or a defect may exist in the near future as the printing continues. In one or more embodiments, the control processor (110) generates a feedback signal that adjusts the printer head (104) to reduce the defect(s), mitigate the defect(s), prevent additional defects, etc. as the printing continues. Additionally or alternatively, printing is aborted if there is a defect in the object being printed.

In one or more embodiments, the control processor (110) also selects the scanning mode based on the 3D printable model of the object (discussed below). The control processor (110) may also select a different scanning mode if poor results are being obtained (discussed below).

While FIG. 1 shows a specific configuration of components, other configurations may be used without departing from the scope of the invention. For example, various components may be combined to create a single component. As another example, the functionality performed by a single component may be performed by two or more components.

Figure 2:
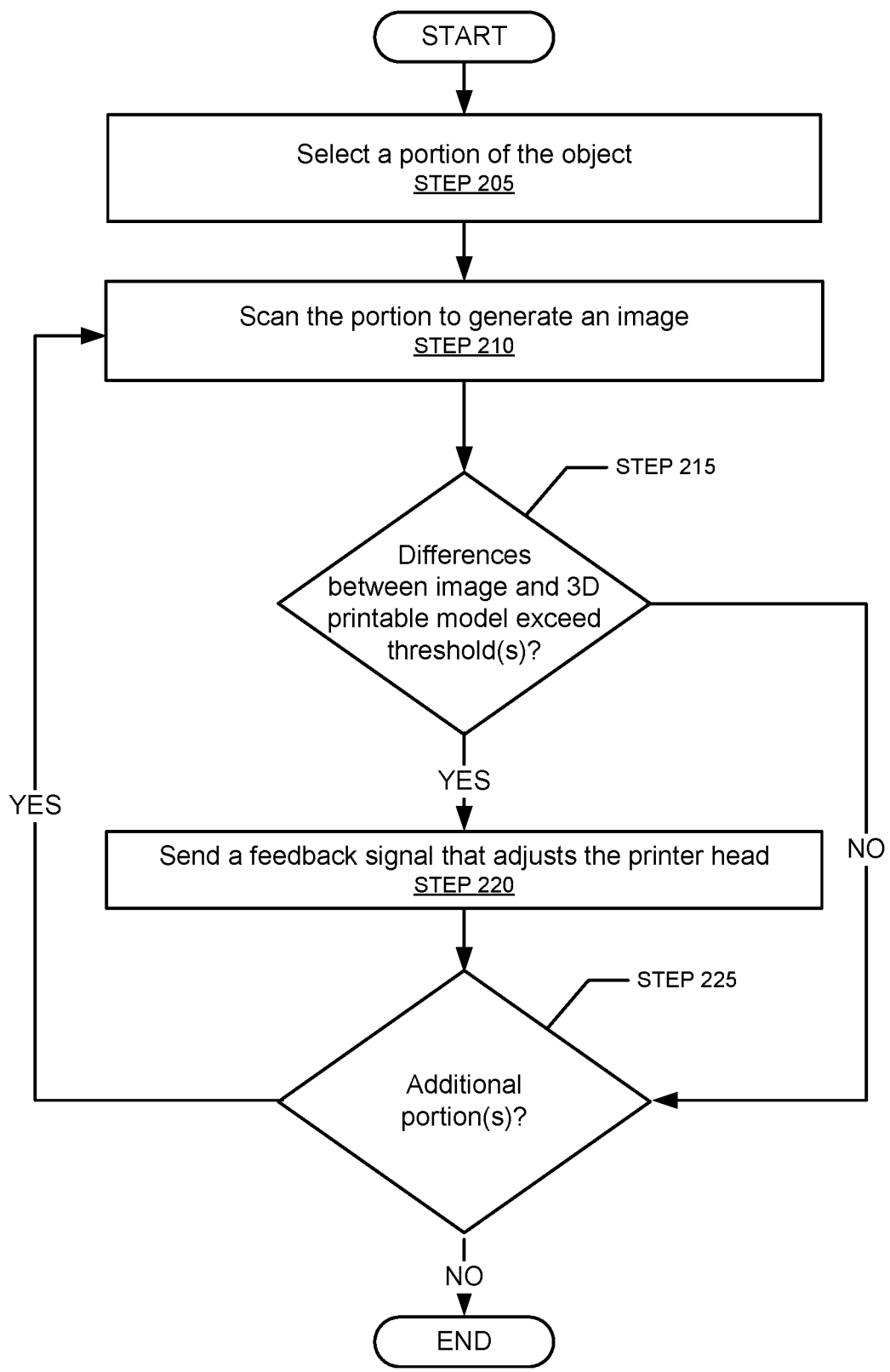
FIG. 2 shows a flowchart in accordance with one or more embodiments of the invention.

FIG. 2 shows a flowchart for 3D printing an object based on a 3D model of the object. One or more of the steps in FIG. 2 may be performed by the components of the system (100), discussed above in reference to FIG. 1. In one or more embodiments of the invention, one or more of the steps shown in FIG. 2 may be omitted, repeated, and/or performed in a different order than the order shown in FIG. 2. Accordingly, the scope of the invention should not be considered limited to the specific arrangement of steps shown in FIG. 2.

Initially, a portion of the object being printed is selected for scanning (STEP 205). The portion may correspond to a newly deposited layer or a segment of the newly deposited layer. The portion may correspond to a volume of the printed object. The portion may extend across multiple zones.

In STEP 210, the selected portion of the object is scanned. Regardless of the operating mode, the measurements from the scanning are used to generate an image of the portion.

If operating in synchronous mode, only one LiDAR sensor (i.e., the LiDAR sensor in the same zone as the printer head) is used at a given time to scan the portion. If the portion extends across multiple zones, multiple LiDAR sensors corresponding to the multiple zones will be used, one after the other, to scan the portion.

If operating in asynchronous mode, all the LiDAR sensors are simultaneously active. Accordingly, the entire portion may be scanned at the same time. Different LiDAR sensors may use different wavelength to reduce cross-talk.

If operating in partial asynchronous mode: (i) the LiDAR sensor in the same zone as the printer head; and (ii) the LiDAR sensor in the zone that is spaced 180 degrees or the closest to 180 degrees from the zone having the printer head are active and scanning the portion of the object.

In STEP 215, the image generated from the scanning and the 3D printable model of the object are compared. If one or more differences between the image and the 3D printable model exceed a tolerance(s), this is an indication that the portion has a defect and/or a defect may exist in the near future as the printing continues. In such cases, the process proceeds to STEP 220. Otherwise, the process proceeds to STEP 225.

In STEP 220, a feedback signal is generated. The feedback signal is used to adjust the printer head in an attempt to reduce the defect(s), mitigate the defect(s), prevent additional defects, etc. as the printing continues. The adjustment may pertain to the positioning of the printer head, the rate at which material is deposited by the printer head, etc.

In STEP 225, it is determined whether there are additional portions of the object to consider. When it is determined that there are additional portions to consider, the process returns to STEP 205. When the printing of the object has completed, the process may end.

Figure 3:
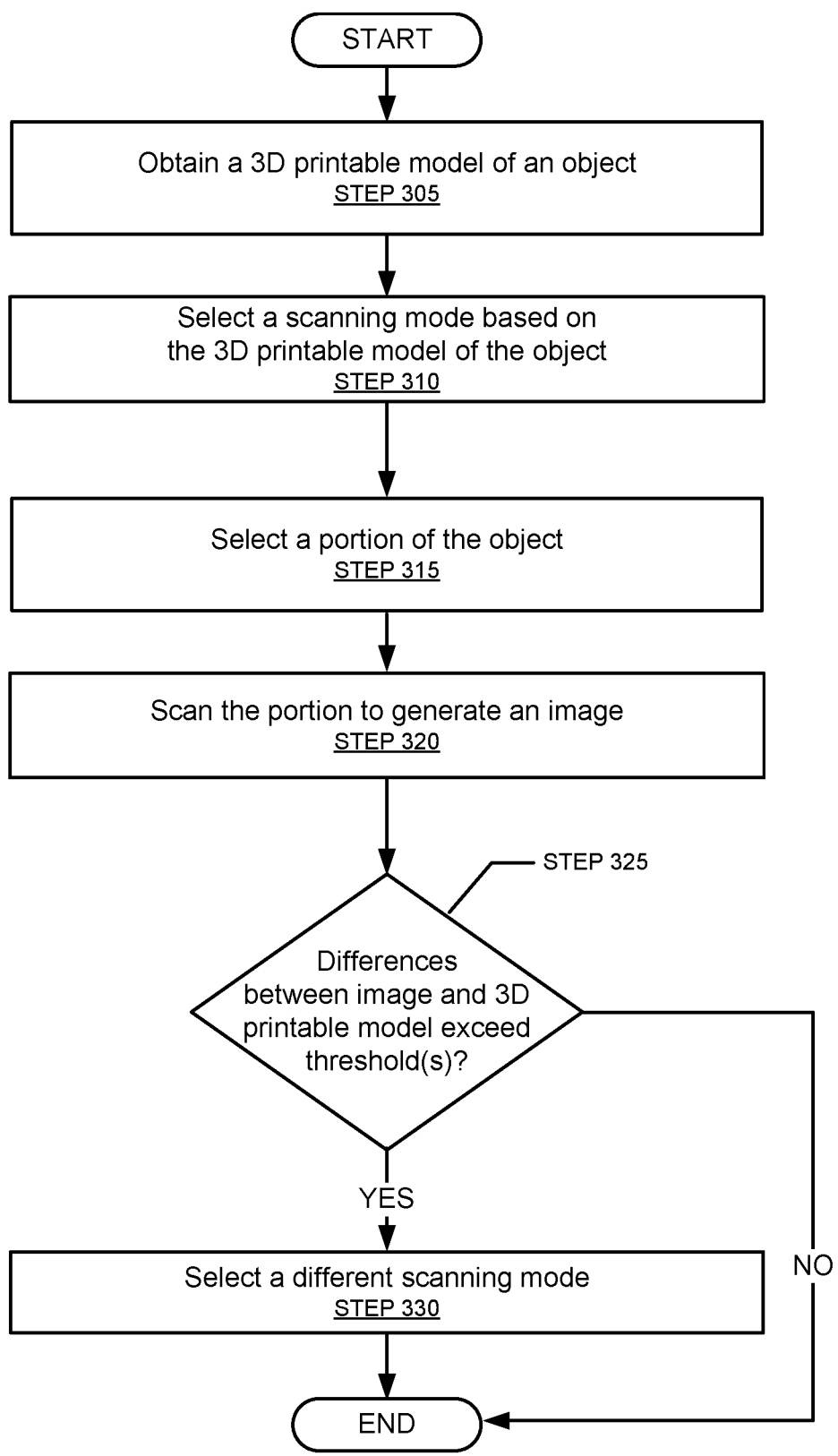
FIG. 3 shows a flowchart in accordance with one or more embodiments of the invention.

FIG. 3 shows a flowchart in accordance with one or more embodiments of the invention. The process in FIG. 3 may be used to select a scanning mode (e.g., synchronous mode, asynchronous mode, partial asynchronous mode, etc.). One or more of the steps in FIG. 2 may be performed by the components of the system (100) (e.g., control processor (110)), discussed above in reference to FIG. 1. In one or more embodiments of the invention, one or more of the steps shown in FIG. 3 may be omitted, repeated, and/or performed in a different order than the order shown in FIG. 3. Accordingly, the scope of the invention should not be considered limited to the specific arrangement of steps shown in FIG. 3. In one or more embodiments of the invention, some or all of the steps in FIG. 3 are performed before the process shown in FIG. 2.

Initially, a 3D printable model of the object is obtained (STEP 305). The 3D printable mode may be obtained from a user computing device and/or downloaded from a website. The 3D printable model may be a CAD drawing of the object.

In STEP 310, a scanning mode is selected based on the 3D printable model. For example, if the 3D printable model is large and complex, as is likely to be the case in an industrial setting, asynchronous mode may be selected. Additionally or alternatively, if the 3D printable model is on the smaller size, as is likely to be the case in a home setting, synchronous mode is selected. Additionally or alternatively, in one or more embodiments of the invention, synchronous mode is selected as a default regardless of the 3D printable model.

In STEP 315, a portion of the object being printed is selected for scanning. The portion may correspond to a newly deposited layer or a segment of the newly deposited layer. The portion may correspond to a volume of the printed object. The portion may extend across multiple zones.

In one or more embodiments, STEP 315 is executed before STEP 310. In such embodiments, the selection of the scanning mode is only based on the segment of the 3D printable model corresponding to the selected portion (i.e., not the entire 3D printable model). Accordingly, different scanning modes may be selected for different portions.

In STEP 320, the selected portion of the object is scanned. Regardless of the operating mode, the measurements from the scanning are used to generate an image of the portion.

If operating in synchronous mode, only one LiDAR sensor (i.e., the LiDAR sensor in the same zone as the printer head) is used at a given time to scan the portion. If the portion extends across multiple zones, multiple LiDAR sensors corresponding to the multiple zones will be used, one after the other, to scan the portion.

If operating in asynchronous mode, all the LiDAR sensors are simultaneously active. Accordingly, the entire portion may be scanned at the same time. Different LiDAR sensors may use different wavelength to reduce cross-talk.

If operating in partial asynchronous mode: (i) the LiDAR sensor in the same zone as the printer head; and (ii) the LiDAR sensor in the zone that is spaced 180 degrees or the closest to 180 degrees from the zone having the printer head are active and scanning the portion of the object.

In STEP 325, the image generated from the scanning and the 3D printable model of the object are compared. If one or more differences between the image and the 3D printable model exceed a tolerance(s), this is a potential indication that the wrong (or inappropriate) scanning mode has been selected. In other words, a different scanning mode would be more suitable for the portion. In such cases, the process proceeds to STEP 330.

In STEP 330, a different scanning mode is selected. For example, if synchronous mode is initially selected in STEP 305, then asynchronous mode may be selected in STEP 330. A different scanning mode is selected in the hope that it will be mode suitable to scan the portion (i.e., smaller/fewer differences between the image generated based on the scanning and the 3D printable model).

Following the execution of STEP 330 (i.e., selection of a different scanning mode), the process in FIG. 2 may be executed with the selected different scanning mode. In one or more embodiments of the invention, the process in FIG. 2 is executed following the execution of STEP 310 (i.e., STEPS 315, 320, 325, and 330 may be omitted).

One or more embodiments of the invention may provide one or more of the following advantages: real-time modeling of a 3D printed object; reduce size, weight, and cost of 3D imaging systems for AM/3DP systems; utilizing real-time 3D images of the 3D printed object for real-time process monitoring; utilizing real-time 3D images of the 3D printed object to identify errors or defects; utilizing real-time 3D images of the 3D printed object to correct, reduce, or mitigate errors or defects in real-time; some synchronous operation modes may allow for lower power, single-wavelength lasers, and lower data volumes to be employed; some asynchronous operation modes may allow for different laser wavelengths to avoid cross-talking; some asynchronous modes may allow for multi-angle images and no zone stitching.

While the invention has been described with respect to a limited number of embodiments, those skilled in the art, having benefit of this disclosure, will appreciate that other embodiments can be devised without departing from the scope of the invention as disclosed herein. Accordingly, the scope of the invention should be limited only by the attached claims.

What is claimed is:

1. A method for 3D printing an object based on a 3D printable model of the object, comprising:

scanning, by a first LiDAR sensor of a plurality of LiDAR sensors, a portion of the object while the object is being printed by a printer head;
generating an image of at least the portion of the object based on scanning the portion;
generating a comparison by comparing the image with the 3D printable model; and
sending a feedback signal that adjusts the printer head based on the comparison, wherein
the plurality of LiDAR sensors operate at a same wavelength,
one of the plurality of LiDAR sensors closest to the printer head is active for scanning, and
a remainder of the plurality of LiDAR sensors are inactive for scanning.

2. The method of claim 1, wherein:
the plurality of LiDAR sensors comprises three LiDAR sensors, and
the three LiDAR sensors are spaced 120 degrees apart around a deposition plane comprising the object being printed.

3. The method of claim 1, wherein:
the plurality of LiDAR sensors comprises four LiDAR sensors, and
the four LiDAR sensors are spaced 90 degrees apart around a deposition plane comprising the object being printed.

4. The method of claim 1, wherein:
the plurality of LiDAR sensors comprises six LiDAR sensors, and
the six LiDAR sensors are spaced 60 degrees apart around a deposition plane comprising the object being printed.

5. A method for 3D printing an object based on a 3D printable model of the object, comprising:
scanning, by a first LiDAR sensor of a plurality of LiDAR sensors, a portion of the object while the object is being printed by a printer head;
generating an image of at least the portion of the object based on scanning the portion;
generating a comparison by comparing the image with the 3D printable model; and
sending a feedback signal that adjusts the printer head based on the comparison, wherein
the plurality of LiDAR sensors operate at different wavelengths, and
all of the plurality of LiDAR sensors are active for scanning.

6. The method of claim 5, wherein
the plurality of LiDAR sensors comprises six LiDAR sensors, and
the six LiDAR sensors are spaced 60 degrees apart around a deposition plane comprising the object being printed.

7. A method for 3D printing an object based on a 3D printable model of the object, comprising:
scanning, by a first LiDAR sensor of a plurality of LiDAR sensors, a portion of the object while the object is being printed by a printer head;
generating an image of at least the portion of the object based on scanning the portion;
generating a comparison by comparing the image with the 3D printable model; and
sending a feedback signal that adjusts the printer head based on the comparison, wherein
the method further comprises:
activating the first LiDAR sensor in response to the first LiDAR sensor being in a same zone as the printer head; and
activating, while the first LiDAR sensor is activated, a second LiDAR sensor spaced approximately 180 degrees from the first LiDAR sensor,
wherein the image is further generated based on scanning by the second LiDAR sensor, and
wherein a remainder of the plurality of LiDAR sensors are not active while the first LiDAR sensor and the second LiDAR sensor are scanning.

8. A method comprising:
obtaining a 3D printable model of an object;
selecting a first scanning mode based on the 3D printable model of the object;
scanning, according to the first scanning mode and by at least one sensor of a plurality of sensors, a portion of the object while the object is being printed by a printer head;
generating a first image of at least the portion of the object based on scanning the portion using the first scanning mode; and
generating a first comparison by comparing the first image with the 3D printable model wherein
the plurality of sensors operate at a same wavelength,
one of the plurality of sensors closest to the printer head is active for scanning, and
a remainder of the plurality of sensors are inactive for scanning.

9. The method of claim 8, further comprising:
selecting a second scanning mode based on the first comparison of the first image with the 3D printable model;
scanning, according to the second scanning mode, the portion of the object;
generating a second image of at least the portion of the object based on scanning the portion using the second scanning mode;
generating a second comparison by comparing the second image with the 3D printable model; and
sending a feedback signal that adjusts the printer head based on the second comparison.

10. The method of claim 9, wherein the first scanning mode is synchronous mode, and wherein the second scanning mode is asynchronous mode.

11. The method of claim 8, wherein:
the plurality of sensors comprises three LiDAR sensors, and
the three LiDAR sensors are spaced 120 degrees apart around a deposition plane comprising the object being printed.

12. The method of claim 8, wherein:
the plurality of sensors comprises four LiDAR sensors, and
the four LiDAR sensors are spaced 90 degrees apart around a deposition plane comprising the object being printed.

13. The method of claim 8, wherein:
the plurality of sensors comprises six LiDAR sensors, and
the six LiDAR sensors are spaced 60 degrees apart around a deposition plane comprising the object being printed.

14. The method of claim 8, wherein each of the plurality of sensors is a LiDAR sensor.

15. A method comprising:
obtaining a 3D printable model of an object;
selecting a first scanning mode based on the 3D printable model of the object;

scanning, according to the first scanning mode and by at least one sensor of a plurality of sensors, a portion of the object while the object is being printed by a printer head;
generating a first image of at least the portion of the object based on scanning the portion using the first scanning mode; and
generating a first comparison by comparing the first image with the 3D printable model, wherein
the method further comprises:
selecting the portion of the object, wherein
selecting the first scanning mode is based only on a segment of the 3D printable model corresponding to the portion.

16. A method comprising:
obtaining a 3D printable model of an object;
selecting a first scanning mode based on the 3D printable model of the object;
scanning, according to the first scanning mode and by at least one sensor of a plurality of sensors, a portion of the object while the object is being printed by a printer head;
generating a first image of at least the portion of the object based on scanning the portion using the first scanning mode; and
generating a first comparison by comparing the first image with the 3D printable model, wherein
the plurality of sensors operate at different wavelengths, and
all of the plurality of sensors are active for scanning.

17. The method of claim 16, wherein
the plurality of sensors comprises six LiDAR sensors, and
the six LiDAR sensors are spaced 60 degrees apart around a deposition plane comprising the object being printed.

* * * * *